United States Patent
Ludwig

(10) Patent No.: US 7,725,211 B2
(45) Date of Patent: May 25, 2010

(54) CONTROL SYSTEM AND A CONTROL METHOD FOR INJECTION MOLDING MACHINES

(75) Inventor: Franz Josef Ludwig, Duerrholz (DE)

(73) Assignee: Dr. Boy GmbH & Co. KG, Neustadt-Fernthal (DE)

( * ) Notice: Subject to any disclaimer, the term of this patent is extended or adjusted under 35 U.S.C. 154(b) by 40 days.

(21) Appl. No.: 11/654,433

(22) Filed: Jan. 16, 2007

(65) Prior Publication Data

US 2007/0168079 A1    Jul. 19, 2007

(30) Foreign Application Priority Data

Jan. 18, 2006  (DE) .................. 10 2006 002 296

(51) Int. Cl.
*B29C 45/00*   (2006.01)
(52) U.S. Cl. .............. 700/200; 700/204; 264/40.1
(58) Field of Classification Search .......... 700/197, 700/200–204; 425/143, 144, 145; 264/40.1, 264/40.5, 40.6
See application file for complete search history.

(56) References Cited

U.S. PATENT DOCUMENTS

| | | | | |
|---|---|---|---|---|
| 4,847,023 A | * | 7/1989 | Neko | 264/40.1 |
| 4,966,738 A | * | 10/1990 | Inaba et al. | 264/40.5 |
| 5,023,028 A | * | 6/1991 | Kamiguchi et al. | 264/40.1 |
| 5,062,785 A | * | 11/1991 | Stroud et al. | 425/145 |
| 5,173,223 A | * | 12/1992 | Kamiguchi et al. | 264/40.1 |
| 5,217,662 A | * | 6/1993 | Yamamura et al. | 264/40.1 |
| 5,551,857 A | * | 9/1996 | Fujioka et al. | 425/143 |
| 5,720,912 A | * | 2/1998 | Liehr et al. | 425/144 |
| 6,108,587 A | * | 8/2000 | Shearer et al. | 700/200 |
| 6,682,669 B2 | * | 1/2004 | Bulgrin et al. | 264/40.1 |
| 7,054,693 B2 | * | 5/2006 | Fischbach et al. | 700/9 |
| 7,160,490 B2 | | 1/2007 | Hofmann | 264/40.1 |
| 7,311,508 B2 | * | 12/2007 | Ueda et al. | 425/150 |
| 2002/0163097 A1 | | 11/2002 | Sasaki et al. | 264/40.1 |
| 2007/0112457 A1 | | 5/2007 | Ludwig | 700/200 |

FOREIGN PATENT DOCUMENTS

| | | |
|---|---|---|
| DE | 10 2005 054 769 B3 | 6/2007 |
| EP | 1 163 993 A2 | 12/2001 |
| EP | 1 245 364 A1 | 10/2002 |

\* cited by examiner

*Primary Examiner*—Charles R Kasenge
(74) *Attorney, Agent, or Firm*—Fay Sharpe LLP

(57) ABSTRACT

A control system for injection molding machines comprises a memory means (16) for storing set values. Further, a signal input for the transmission of actual values to the control system is provided. A first control means (18) is used for the transmission of a control field with consideration to previous values. A second control means (20) is provided for the transmission of a correction value, in particular with consideration to a deviation of the actual value from the set value. A correlation means (22) serves to correlate the control field values with the correction value for outputting a control variable.

11 Claims, 1 Drawing Sheet

CONTROL SYSTEM AND A CONTROL METHOD FOR INJECTION MOLDING MACHINES

BACKGROUND OF THE INVENTION

1. Field of the Invention

The invention is directed to a control system and a control method for injection molding machines.

2. Description of Related Art

Controlling injection molding machines requires to perform as exact a control of the speed and/or position as possible. Such controls are necessary, for example, for displacing the closing unit, displacing and driving the injection unit, and the like. Control systems for injection molding machines use PID (proportional plus integral plus derivative) controllers for control purposes. Speed is controlled, for example, by a speed profile being inputted into a memory means by a user. The user profile thus represents the target values. By means of the control system, for example, the current actual value of the speed is compared to the required target speed value. Depending on the current deviation between the target value and the actual value, the PID controller determines a control variable in order to achieve an adjustment of the actual value to the target value. This method is well suited, for example, for controlling constant speeds, e.g. the rotation of a feed screw, since the speeds are to be maintained constant over a longer period of time. However, if accelerations are to be controlled, the known control system has a drawback that the PID controller responds exclusively to a current deviation between the target value and the actual value, whereby the actual value always lags behind the target value.

A target value of a speed is predetermined as a target value development 10 (FIG. 1) and has a trapezoidal development. In a corresponding speed control using a PID controller of the prior art, an actual value follows the development 12 shown as a dotted line. Depending on a current comparison between the actual value 12 and the target value 10, a development of a control variable 14 shown in a dashed line is calculated, and a corresponding control variable is transmitted to the drive motor, a corresponding control or the like. As is obvious from FIG. 1, controlling a speed development using a PID controller always amounts to responding. At a time $t_1$, the actual value 12 is below the target value 10. This is due to the start-up behavior and the inertia of the system. Thus, at the time $t_1$, a control variable 14 is above the target value 10. According to the development of the target value, a constant speed is to be maintained at the time $t_2$ after an acceleration has come to an end. Since the PID controller can always only compare current values, an overshooting of the actual value curve occurs at the time $t_2$. By a corresponding counter-control using the control variable 14, an undershooting of the target value 10 is caused at the time $t_3$. Such over- and undershooting occurs until the system has settled. From a time $t_4$, when a braking or a reduction of the speed is performed, corresponding curve progressions are obtained. Since the PID controller, as illustrated in FIG. 1, can always only respond to an instantaneous comparison between the actual value and the target value, no high quality of control can be achieved.

Another drawback of PID controllers is that PID controllers cannot respond to long-term changes such as signs of wear, temperature variations or different qualities of the raw material. As a consequence, a PID-controller is unable to compensate, for example, signs of wear from a certain degree on. This compromises the quality of the parts produced.

EP 1 245 364, EP 1 163 993 and U.S. 2002/0163097 describe different control methods for injection molding machines, which, however, do not solve the above problem.

SUMMARY OF THE INVENTION

It is an object of the present invention to provide a control system, as well as a control method for injection molding machines with which the quality of control can be improved.

A control system for an injection molding machine, which is especially suited for controlling the speed and the position of individual components of the injection molding machine, such as the closing mechanism, the injection unit and the like, comprises a memory means for storing set values. For example, a user may input a set value profile, such as a speed profile, a position profile, etc., into the memory means. Further, the control system has a signal input. The signal input is connected, for example, with sensors arranged in the injection molding machine, so that actual values can be transmitted to the control system via the signal input.

The invention provides a first and a second control means in the control system. Using the first control means, the control field is determined. The control field serves to control a corresponding motor, a regulating means, a control means, or the like. The control field includes values with which, for example, a drive motor is controlled in order to operate the motor according to the predetermined set values. Here, the first control means is particular in that the control field is determined with consideration to previous values. Thus, the determination or calculation of the control field takes into account set values, actual values and/or control field values of previous operation cycles, in particular of the immediately foregoing operation cycle. If, in a previous cycle, a difference between a set value and an actual value occurred, this is considered in the determination of the new or current control field, so that an extremely exact retracing of the set value development is possible with the aid of the first control means. The difference between the set value and the actual value is therefore extremely small. Thus, the first control means is an adaptive control means, which, for example, can also consider a larger number of previous values. In doing so, a different weighting of previous values may also be performed. In particular, it can be taken into account which effects changing individual control field values will have. This allows for an extremely exact adjustment of the current value curve to the set value curve. However, such a control means, whose control operation is based on consideration to previous values, is disadvantageous in that unexpected variations occurring in a cycle can not be taken into account. An immediate response to such variations is not possible with the help of the first control means, since it would consider this variation only in the next cycle. Sudden unexpected variations may be, for example, an unexpected change in the friction conditions, such as caused by a rupture in the lubricant film.

According to the invention, the control system is therefore provided with a second control means in addition to the first control means. The second control means serves to transmit at least one correction value. Here, the second control means is adapted to correct sudden variations. Using the second control means, an instantaneous comparison of the set value and the actual value is thus performed. An immediate response can then be made with the help of the second control means.

A first control means, whose control considers previous values, in combination with a second control means considering current changes in values, as provided by the present invention, is thus advantageous in that an extremely exact retracing of the set value curve is possible through the first control means, while providing the second control means avoids the disadvantage occurring with instantaneous troubles.

A correlation means correlates the control field values with the correction value for the output of a control variable. The control variable is transmitted to corresponding control means, such as a motor, actuators and the like, for operating the injection molding machine.

The previous values considered by the first control means, which may comprise an immediately preceding cycle or a greater number of preceding cycles, are preferably latched in a memory means, in particular in the existing memory means for storing the set values. It is thus possible to retrieve these values for analyzing purposes, for example. Further, it is possible, to vary the control strategy of the first control means, for example, by allowing a user to predetermine what number of previous cycles, possibly with what weighting, will be considered. In particular, the first control means considers differences between set and actual values caused by a previous control field.

In a particularly preferred embodiment, the first control means comprises an ILR controller (iteratively learning controller). The operation and the advantages of ILR controllers has been described, for example, in Heiko Hengen, System— und Signalorientierte Entwurf iterativlernende Regelung, Verlag Shaker, Aachen 2002, in particular pages 117-123.

The first control means, which especially is an ILR controller, specifically has the advantage that long-term or slowly materializing changes can be compensated very exactly. Such changes may be, for example, signs of wear, temperature changes or changes in the quality of raw materials.

The second control means, which especially determines or calculates one or a plurality of correction values with consideration to a current difference between set and actual values, preferably is provided with a PID controller. Here, a conventional PID controller may be used.

Preferably, the second control means calculates a correction value only after a threshold value is exceeded/undershot. Thereby, it is guaranteed that the second control means does not affect the first control means negatively, but is activated only in the event of trouble.

Preferably, the correlation means is configured such that a correction value that is outputted by the second control means especially only in a defined case of trouble, is preferred over the control field value predetermined by the first control means. This allows for a fast interference with the control, so that specifically the quality of the parts manufactured with the injection molding machine is not impaired by sudden and possibly short-term troubles.

For the determination or calculation of the set values, the memory means is preferably connected with a control means. Specifically, the control means comprises an industrial computer (IPC) and an input means such as a key-board, so that a user can enter a corresponding data input. In a particularly preferred embodiment, the control means comprises an FPGA (Field Programmable Gate Array). It is particularly preferred, to combine the present control means with a control system and control methods for an injection molding machine, such a control means being described in the U.S. 2007/0112457.

The invention further refers to a control method for injection molding machines. According to this control method, set values and actual values of a speed or position control are determined, for example. Taking into account previous values, a control field for operating an actuating means, such as an actuating motor, is determined. The previous values especially are actual values, set values or control field values of one or more previous cycles. Moreover, a correction value is determined. Through this correction value, current changes or troubles are preferably taken into account. The control field values and the correction value are correlated for output to an actuating element or the like. Preferably, the present control method is advantageously developed as explained above in connection with the control system.

Operation is possible both with one and with both control means. When operated with one control means, the ILR directly generates the control variable for the process to be controlled, whereas, when operated "in series", the ILR acts on the second control means (PID) that eliminates trouble of the above mentioned kind as a subordinated "inner loop".

A control trajectory for the first ILR cycle (if only one control means is used) can be achieved by impressing the set trajectory on the subordinated system and observing the control trajectory generated by the PID controller. Alternatively, the set curve is followed under control.

BRIEF DESCRIPTION OF THE DRAWINGS

The following is a detailed description of a preferred embodiment of the present invention with reference to the accompanying drawings.

In the Figures.

Figure 1:
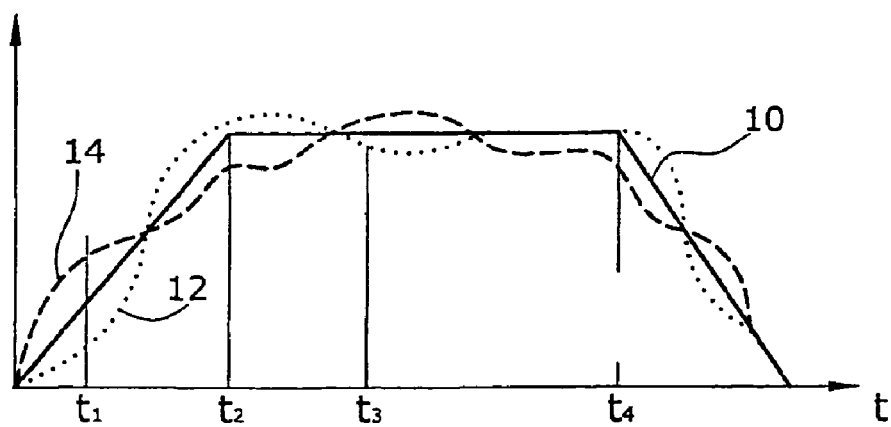
FIG. 1 is a schematic diagram of speed plotted against time when using a PID controller of the prior art.
Figure 2:
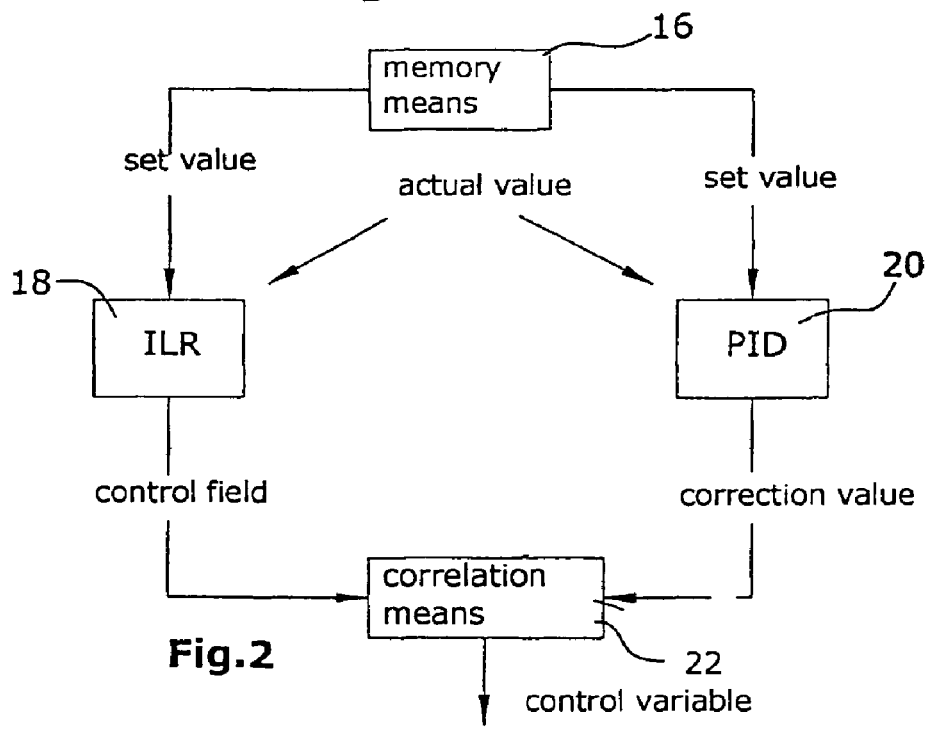
FIG. 2 is a functional diagram of a control system according to the present invention.

In the embodiment illustrated, set values are stored in a memory means 16. Further, actual values are detected via sensors arranged in the injection molding device, for example. Both the set values and the actual values are transmitted to a first control means 18 and a second control means 20. In a particularly preferred embodiment, the first control means is an ILR controller. In a preferred embodiment, the second control means is a PID controller. Using the ILR controller 18, a control field is calculated and transmitted to a correlation means 22. Here, the transmission of the entire control field for a next cycle may be done in a single transmission. Further, it is possible to transmit individual control field values or sets of control field values to the correlation means 22.

Depending on the difference between the actual value and the set value, the PID controller 20 determines a correction value which is immediately transmitted to the correlation means 22. The correlation means 22 correlates the instantaneous control field value with a correction value possibly transmitted to the correlation means 22, the correction value being preferred by the correlation means 22, since the correction value is a compensation for a present trouble. Thereafter, the correlation means 22 transmits a control variable to an actuating means of the injection molding machine.

Figure 3:
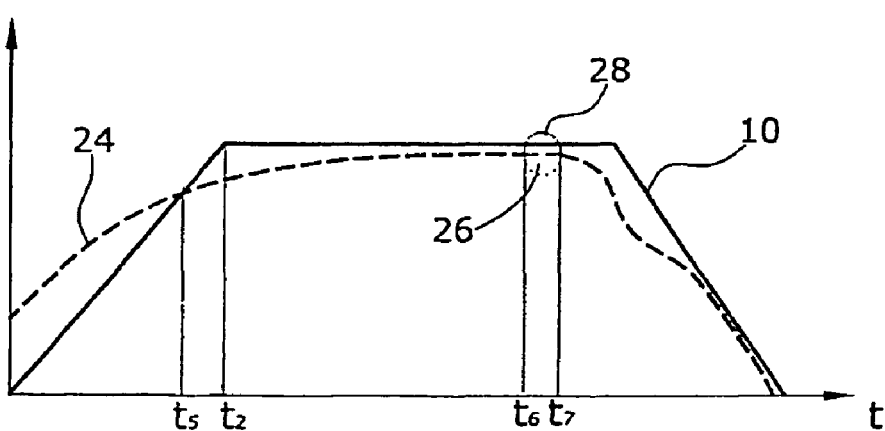
FIG. 3 is a schematic diagram of time plotted against speed when using the control system of the present invention.

If, for example, the present control system serves to control a speed profile, this may be done, for example, as illustrated in FIG. 3. Here, the set values of speed form a trapezoidal curve 10. Since the IRL controller knows set values, actual values and control field values from previous cycles, the IRL controller calculates a control field that corresponds to the dashed curve 24. Here, for example, it is noticeable, especially when compared to the control curve of FIG. 1 produced by a PID controller, that at the beginning of the control operation the control field curve 24 is above the set value curve 10. This is due to the fact that the ILR controller 18 knows the inertia of the system from previous cycles. This inertia is countered by increased initial values. In the further development, from a time $t_5$, the control field has values below the set values. Thus, it is taken into account that due to the mass inertia of the system and the acceleration effected, normally an overshoot would occur upon the change in speed at the time $t_2$. This overshoot is countered at an early stage.

Further, FIG. 3 illustrates a trouble at the time $t_6$. For example, this trouble is a sudden change in friction. As a result, the set value curve, otherwise coincident with the actual value curve 10, deviates from the actual value curve 10 at the time $t_6$ as illustrated by the dotted curve 26. From the time $t_6$ on, the PID controller 20 calculates correction values. Between the times $t_6$ and $t_7$, the correlation means 22 uses the correction values, illustrated in a dash-dotted line, instead of the control field values, as the control variable according to a curve 28 and transmits them to the control field. Thus, it is possible to control a sudden occurrence of trouble.

Although the invention has been described and illustrated with reference to specific embodiments thereof, it is not intended that the invention be limited to those illustrative embodiments. Those skilled in that art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A control system for injection molding machines, for speed and/or position control, comprising:
   a memory which stores set values;
   a signal input for the transmission of actual values to the control system;
   a first control which considers control field set values and/or the actual values of at least one immediately preceding entire previous cycle to determine a non-linear next control field for an entire next cycle, wherein, when determining the entire next cycle control field, the first control means considers a difference between the set and actual values over at least the entire previous cycle control field;
   a second control which generates a correction value to a current cycle control field; and
   a correlation means for correlating the entire next cycle control field from the first control means with the correction value for outputting a control variable for the current cycle control field.

2. The control system of claim 1, wherein the first control comprises an ILR controller.

3. The control system of claim 1, wherein the second control determines the correction value with consideration to a current difference between the set and actual values.

4. The control system of claim 1, wherein the second control generates the correction value only when a threshold value is over-shot/undershot.

5. The control system of claim 1, wherein the correlation means prefers the correction value over the control field values.

6. The control system of claim 1, wherein the memory is connected with a control means for determining the set values.

7. The control system of claim 6, wherein the control means comprises a FPGA.

8. A control system for speed and/or position control of injection molding machines, comprising:
   a memory which stores values;
   a signal input which receives actual values;
   an adaptive control which generates an entire next cycle control field based on control field values of at least an immediately preceding operation cycle such that when in the immediately preceding operation cycle a difference between set value and the actual value has occurred, the difference is used in the generation of the next cycle control field;
   a second control which transmits a correction value, the second control comparing the set value and the actual value during a current cycle such that the correction value corrects for sudden variations in the current cycle; and
   a correlation processor which correlates the entire next cycle control field with the correction value to output a control variable.

9. The control system of claim 8, wherein the adaptive control generates the entire next cycle control field based on the control field values generated in a plurality of preceding operation cycles.

10. The control system of claim 8, wherein the next cycle control field is non-linear.

11. A control system for injection molding machines, for speed and/or position control, comprising:
    a memory which stores set values;
    a signal input for the transmission of actual values to the control system;
    an iterative learning (ILR) controller which considers control field set values and/or the actual values of a plurality of entire previous cycles and determines a next cycle control field for an entire next cycle prior to implementing the next cycle control field, wherein, when determining the entire next cycle control field, the ILR controller considers a difference between the set and actual values in the plurality of previous cycles of the control fields;
    a PID controller which generates correction values to a current cycle control field during implementation of the current cycle; and
    a correlation unit which correlates the next cycle control field received in its entirety from the ILR controller with the correction values from the PID controller for outputting control variables during implementation of the current cycle control field based on a current difference between the set and actual values.

* * * * *